(12) United States Patent
Honsho

(10) Patent No.: US 10,379,314 B2
(45) Date of Patent: Aug. 13, 2019

(54) MULTI-DEGREE-OF-FREEDOM SUPPORT MECHANISM, LENS BARREL, AND OPTICAL DEVICE

(71) Applicant: Panasonic Intellectual Property Management Co., Ltd., Osaka (JP)

(72) Inventor: Hironori Honsho, Hyogo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 136 days.

(21) Appl. No.: 15/063,677

(22) Filed: Mar. 8, 2016

(65) Prior Publication Data

US 2016/0274325 A1    Sep. 22, 2016

(30) Foreign Application Priority Data

Mar. 19, 2015  (JP) .................................. 2015-056265
Dec. 3, 2015   (JP) .................................. 2015-236232

(51) Int. Cl.
  *G02B 7/02*   (2006.01)
  *G02B 7/10*   (2006.01)
  *G02B 27/00*  (2006.01)
  *F16C 11/06*  (2006.01)

(52) U.S. Cl.
  CPC .......... *G02B 7/023* (2013.01); *F16C 11/0604* (2013.01); *F16C 11/0614* (2013.01); *F16C 11/0619* (2013.01); *G02B 7/10* (2013.01); *G02B 27/0068* (2013.01)

(58) Field of Classification Search
  CPC .......... G02B 7/102; G02B 27/64; G02B 6/32; G02B 6/3636; G02B 6/3652; G02B 6/3838; G02B 6/3873; G02B 2027/014; G02B 2027/0178; G02B 26/0875; G02B 27/0093; G02B 27/017; G02B 27/646; G02B 6/255; G02B 6/2553; G02B 6/2555; G02B 6/29365; G02B 6/2938
  USPC .......................... 359/811, 813, 815, 819–824
  See application file for complete search history.

(56) References Cited

U.S. PATENT DOCUMENTS

| | | | |
|---|---|---|---|
| 5,383,936 A | 1/1995 | Kubein-Meesenburg et al. | |
| 5,716,139 A | 2/1998 | Okamoto et al. | |
| 5,957,586 A | 9/1999 | Okamoto et al. | |
| 2008/0019817 A1* | 1/2008 | Komiya | B23Q 1/44 414/749.6 |

(Continued)

FOREIGN PATENT DOCUMENTS

| | | |
|---|---|---|
| JP | 6-189990 | 7/1994 |
| JP | 6-323332 | 11/1994 |

(Continued)

*Primary Examiner* — Brandi N Thomas
(74) *Attorney, Agent, or Firm* — Panasonic IP Management

(57) ABSTRACT

A multi-degree-of-freedom support mechanism includes a first member having a protruding part with a spherical surface, and a second member having a pair of planes opposite to each other across the protruding part. One of the first member and the second member is able to make relative movement with respect to the other with sliding movement of the spherical surface on the pair of planes. The pair of planes is in contact with the spherical surface. The relative movement includes translational movement in two degrees of freedom in planar direction and rotational movement about an axis in three degrees of freedom in the pair of planes.

10 Claims, 9 Drawing Sheets

(56) References Cited

U.S. PATENT DOCUMENTS

| 2009/0141360 | A1* | 6/2009 | Koyama | G02B 5/04 |
| | | | | 359/618 |
| 2012/0194904 | A1 | 8/2012 | Noguchi | |
| 2013/0103145 | A1* | 4/2013 | John | A61B 3/117 |
| | | | | 623/6.12 |

FOREIGN PATENT DOCUMENTS

| JP | 2002-206524 | 7/2002 |
| JP | 2009-234524 | 10/2009 |

* cited by examiner

FIG. 10
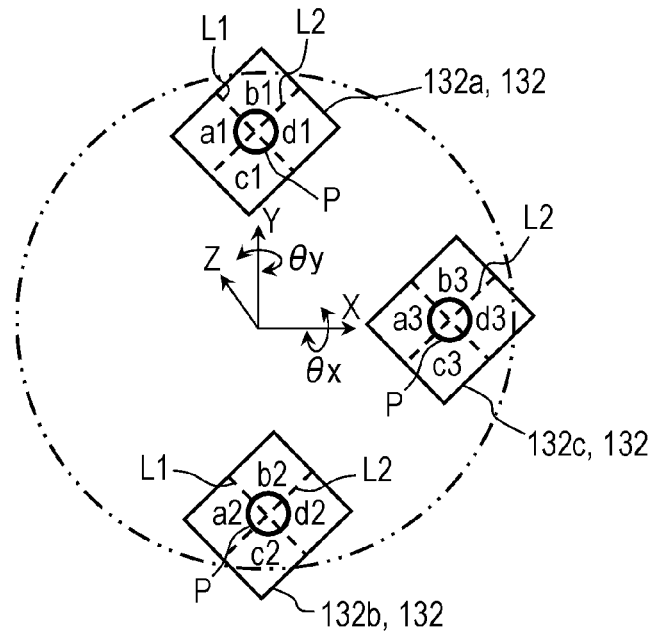
FIG. 11A    FIG. 11B    FIG. 11C
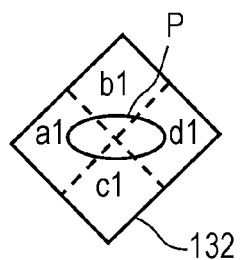 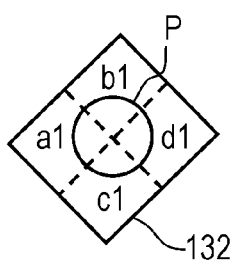 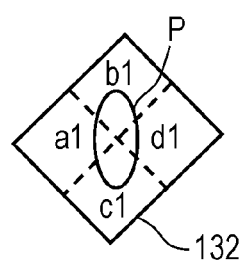

MULTI-DEGREE-OF-FREEDOM SUPPORT MECHANISM, LENS BARREL, AND OPTICAL DEVICE

BACKGROUND

1. Technical Field

The present disclosure relates to a multi-degree-of-freedom support mechanism that enables movement of a support target in five degrees of freedom, and a lens barrel and an optical device which have the multi-degree-of-freedom support mechanism.

2. Description of the Related Art

Patent Literature 1 discloses a carrier device that is able to carry a frame unit in five degrees of freedom using a spherical rotary member.

CITATION LIST

Patent Literature

PTL 1: Unexamined Japanese Patent Publication No. 2009-234524

SUMMARY

The present disclosure provides a multi-degree-of-freedom support mechanism and an optical device that enable movement in five degrees of freedom with a simple configuration.

The multi-degree-of-freedom support mechanism according to the present disclosure includes a first member having a protruding part with a spherical surface, and a second member having a pair of planes opposite to each other across the protruding part. One of the first member and the second member is able to make relative movement with respect to the other with sliding movement of the spherical surface on the pair of planes. The pair of planes is in contact with the spherical surface. The relative movement includes translational movement in two degrees of freedom in planar direction and rotational movement in three degrees of freedom in the pair of planes.

The multi-degree-of-freedom support mechanism according to the present disclosure enables movement in five degrees of freedom.

BRIEF DESCRIPTION OF DRAWINGS

FIG. 10 is a front view schematically illustrating an arrangement example of optical detectors in the optical system driving device according to the first exemplary embodiment;

FIG. 11A is an explanatory view illustrating how a spot of light passing through a first light transmissive unit in the optical system driving device according to the first exemplary embodiment is changed on a light-receiving surface of an optical detector with the movement of the first light transmissive unit toward a negative side in a Z axis direction;

FIG. 11B is an explanatory view illustrating how a spot of light passing through a first light transmissive unit in the optical system driving device according to the first exemplary embodiment is changed on a light-receiving surface of an optical detector with the movement of the first light transmissive unit to a reference position in the Z axis direction;

FIG. 11C is an explanatory view illustrating how a spot of light passing through a first light transmissive unit in the optical system driving device according to the first exemplary embodiment is changed on a light-receiving surface of an optical detector with the movement of the first light transmissive unit toward a positive side in the Z axis direction;

DETAILED DESCRIPTION

Hereinafter, exemplary embodiments will be described in detail with reference to the accompanying drawings as necessary. It is noted, however, that descriptions in more detail than necessary will sometimes be omitted. For example, detailed descriptions of well-known items and duplicate descriptions of substantially the same configuration will sometimes be omitted. This is to avoid unnecessary redundancy in the following description and to facilitate understanding by those skilled in the art.

Note that the accompanying drawings and the following descriptions are provided so as to facilitate fully understanding of the present disclosure by those skilled in the art, and these are not intended to limit the subject matter defined by the claims.

First Exemplary Embodiment

A first exemplary embodiment will be described below with reference to FIGS. 1 to 13.

1-1. Configuration

1-1-1. Optical Device

Figure 1:
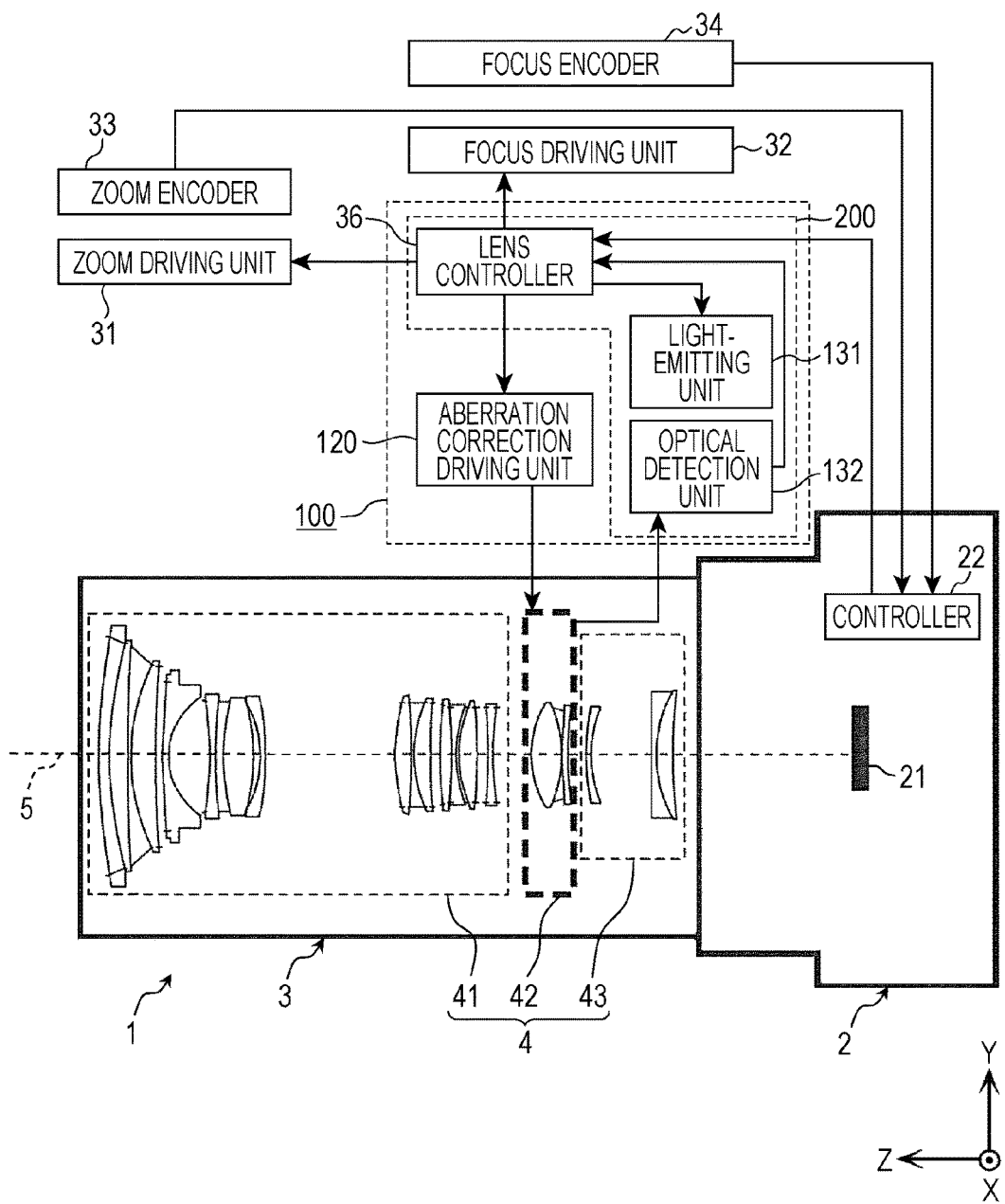
FIG. 1 is an explanatory diagram schematically illustrating a schematic configuration of a digital camera shown as an example of an optical device according to the first exemplary embodiment.

FIG. 1 is an explanatory diagram schematically illustrating a schematic configuration of a digital camera shown as one example of an optical device according to the first exemplary embodiment. As illustrated in FIG. 1, digital camera 1 includes camera body 2 and lens barrel 3.

In the present exemplary embodiment, a three-dimensional orthogonal coordinate system is set as illustrated in FIG. 1. A Z axis direction matches optical axis 5 of later-described optical system 4. A positive side in the Z axis direction means a subject side in the optical axis direction, and the opposite side is specified as a negative side. An X axis direction matches a width direction of digital camera 1 in a plane orthogonal to optical axis 5. A Y axis direction matches a height direction of digital camera 1 in a plane orthogonal to optical axis 5.

Lens barrel 3 includes optical system 4, zoom driving unit 31, focus driving unit 32, zoom encoder 33, focus encoder 34, and optical system driving device 100.

Optical system 4 includes first lens group 41, second lens group 42, and third lens group 43.

First lens group 41 moves along optical axis 5 so as to vary a zoom magnification. Second lens group 42 corrects aberration of optical system 4 through a control of an attitude of second lens group 42 relative to optical axis 5. Third lens group 43 adjusts a focus state of a subject image along optical axis 5.

Zoom driving unit 31 is, for example, a stepping motor that moves first lens group 41 along optical axis 5.

Focus driving unit 32 is, for example, a stepping motor that moves third lens group 43 along optical axis 5.

Zoom encoder 33 detects a zoom position (variable magnification position) of first lens group 41, and outputs the detected position to controller 22 (described later) of camera body 2.

Focus encoder 34 detects a focus position of third lens group 43, and outputs the resultant to controller 22 of camera body 2.

Optical system driving device 100 controls an attitude of second lens group 42 relative to optical axis 5. Optical system driving device 100 includes support mechanism 110 (see FIG. 2), aberration correction driving unit 120, light-emitting units 131, optical detectors 132, and lens controller 36.

Aberration correction driving unit 120 moves second lens group 42 relative to optical axis 5.

Light-emitting unit 131 and optical detector 132 detect a position of second lens group 42.

Lens controller 36 is a control device controlling a core of lens barrel 3. Lens controller 36 is connected to units mounted to lens barrel 3, and performs various sequence controls of lens barrel 3. Lens controller 36 includes a CPU (Central Processing Unit) including a control circuit, a ROM (Read Only Memory), a RAM (Random Access Memory), and the like. Lens controller 36 can implement various functions when a program stored in the ROM is read into the CPU.

Support mechanism 110 supports second lens group 42 so as to be movable.

The detail of optical system driving device 100 will be described later.

Camera body 2 includes imaging element 21 and controller 22.

Imaging element 21 is, for example, a CCD (Charge Coupled Device) which converts an optical image formed with optical system 4 of lens barrel 3 into an electrical signal. Imaging element 21 is driven with a timing signal. Notably, imaging element 21 may be a CMOS (Complementary Metal oxide Semiconductor) sensor.

Controller 22 is a control device controlling a core of camera body 2. Controller 22 controls units of digital camera 1 based on operation signals from operation units such as a shutter button or a zoom lever. Specifically, controller 22 includes a CPU, a ROM, a RAM, and the like. Controller 22 can implement various functions when a program stored in the ROM is read into the CPU. For example, when a zoom position is input from zoom encoder 33, and a focus position is input from focus encoder 34, controller 22 calculates a position correction value of second lens group 42 based on the zoom position and the focus position, and outputs the position correction value to lens controller 36. Lens controller 36 controls aberration correction driving unit 120 based on the position correction value and a light-receiving signal output from optical detector 132, thereby controlling an attitude of second lens group 42.

1-1-2. Optical System Driving Device

Next, optical system driving device 100 will be described.

Figure 2:
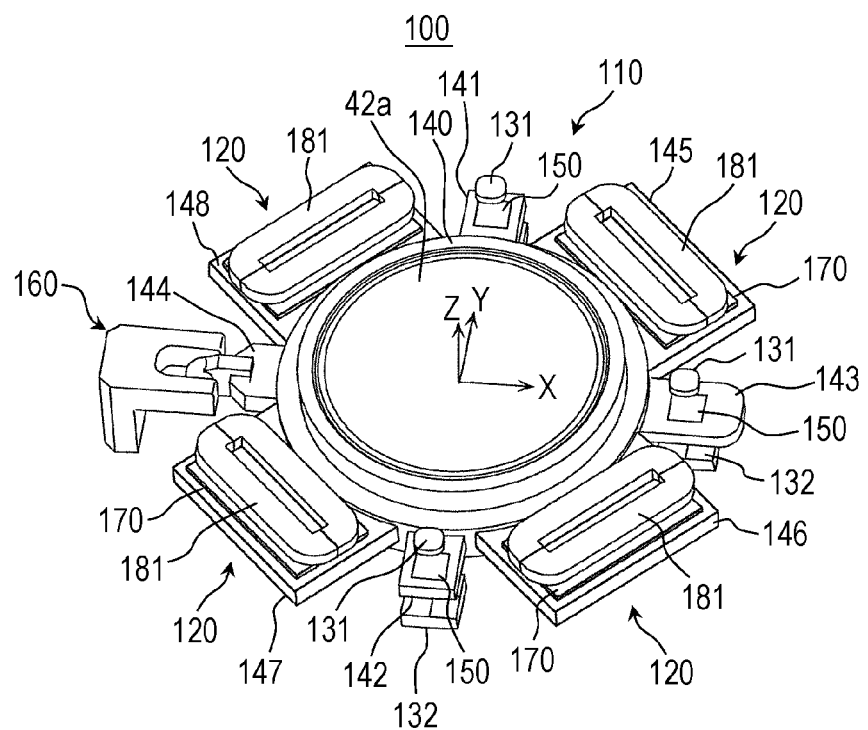
FIG. 2 is a perspective view illustrating an optical system driving device according to the first exemplary embodiment.
Figure 3:
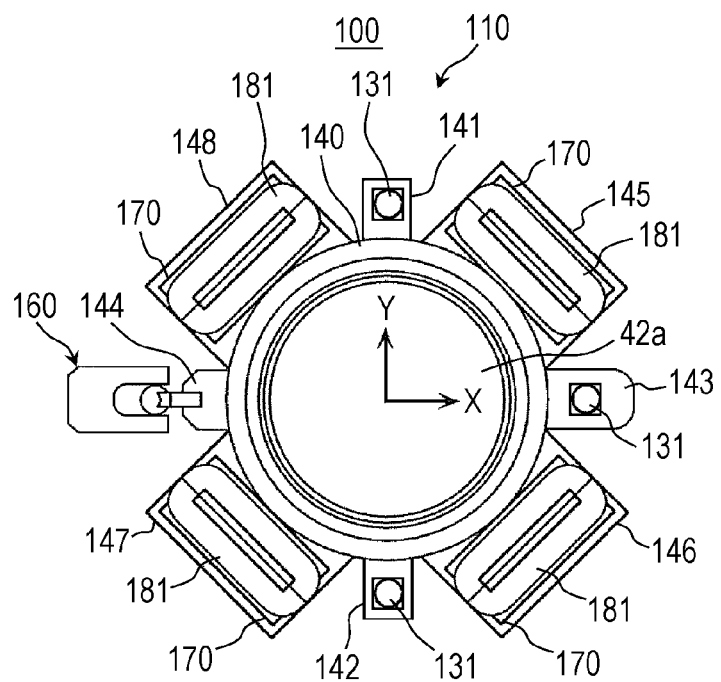
FIG. 3 is a front view illustrating the optical system driving device according to the first exemplary embodiment.
Figure 4:
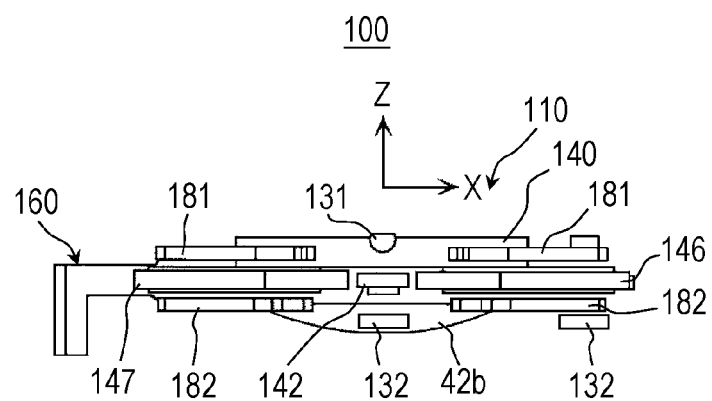
FIG. 4 is a side view illustrating the optical system driving device according to the first exemplary embodiment.
Figure 5:
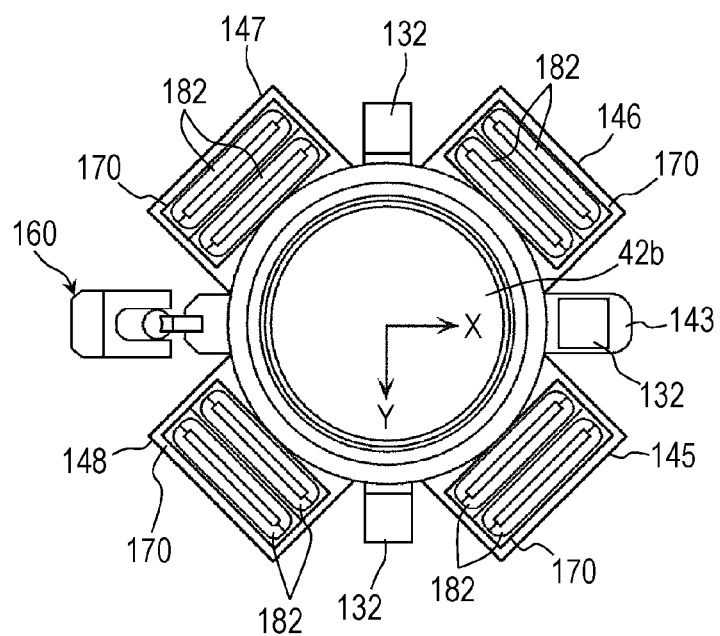
FIG. 5 is a back view illustrating the optical system driving device according to the first exemplary embodiment.

FIG. 2 is a perspective view illustrating optical system driving device 100 according to the first exemplary embodiment. FIG. 3 is a front view illustrating optical system driving device 100 according to the first exemplary embodiment. FIG. 4 is a side view illustrating optical system driving device 100 according to the first exemplary embodiment. FIG. 5 is a back view illustrating optical system driving device 100 according to the first exemplary embodiment.

As illustrated in FIGS. 2 to 5, optical system driving device 100 includes support mechanism 110, aberration correction driving unit 120, light-emitting units 131, and optical detectors 132.

Support mechanism 110 includes lens holder 140, light transmissive units 150, and restriction unit 160. Support mechanism 110 is a multi-degree-of-freedom support mechanism that supports lens holder 140 so as to be movable in five degrees of freedom.

Lent holder (first member) 140 is one example of a movable body which is movable in five degrees of freedom. A degree of freedom means a degree in which one system can be displaced. In the three-dimensional orthogonal coordinate system, a total number of directions in which a system can be moved out of six moving directions is indicated as a degree of freedom, the six moving directions being an X-axis direction, a Y-axis direction, a Z-axis direction, a rotating direction about the X axis, a rotating direction about the Y axis, and a rotation direction about the Z axis. For example, the case in which a system can be moved in only one moving direction is indicated as "one degree of freedom", and the case in which a system can be moved in two directions is indicated as two degrees of freedom.

Lens holder 140 includes two lenses 42a and 42b in second lens group 42. The present exemplary embodiment describes that lens holder 140 holds two lenses 42a and 42b. However, lens holder 140 may hold only one lens, or three or more lenses.

Lens holder 140 encloses two lenses 42a and 42b, which are coaxially disposed, to hold these lenses. Lens holder 140 is provided with first piece part 141 and second piece part 142 at both ends in the Y axis direction, first piece part 141 and second piece part 142 projecting outward along the Y axis direction. Lens holder 140 is also provided with third piece part 143 and fourth piece part 144 at both ends in the X axis direction, third piece part 143 and fourth piece part 144 projecting outward along the X axis direction. Each of first piece part 141, second piece part 142, and third piece part 143 is provided with light transmissive unit 150.

Each of frames 145, 146, 147, and 148 having generally rectangular shape in a plan view is provided between each of piece parts 141, 142, 143, and 144 around lens holder 140. Each of frames 145, 146, 147, and 148 holds magnet unit 170. First coil 181 for moving lens holder 140 in the X axis direction and Y axis direction is mounted to each magnet unit 170 at the positive side in the Z axis direction. A pair of second coils 182 for moving lens holder 140 in the Z axis direction is mounted to each magnet unit 170 at the negative side in the Z axis direction.

Figure 6:
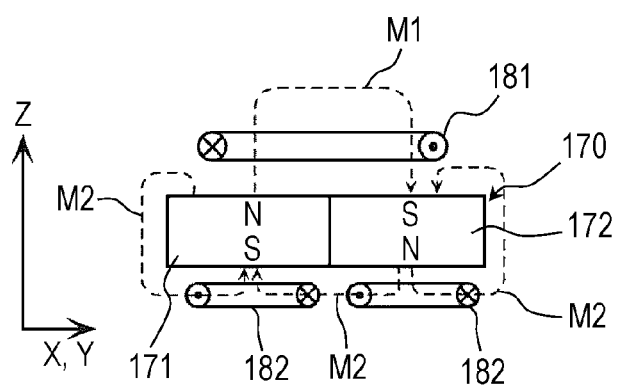
FIG. 6 is a side view illustrating a schematic configuration of a magnet unit, a first coil, and second coils in the optical system driving device according to the first exemplary embodiment.

FIG. 6 is a side view illustrating a schematic configuration of magnet unit 170, first coil 181, and second coils 182 in optical system driving device 100 according to the first exemplary embodiment.

As illustrated in FIG. 6, magnet unit 170 includes two plate magnets 171 and 172 which have a rectangular shape in a plan view and are equal in size. A pair of main surfaces of plate magnets 171 and 172 is exposed from frames 145, 146, 147, and 148, the main surfaces being opposite to each other in the Z axis direction. Each of the pair of main surfaces is parallel to planes of lenses 42a and 42b orthogonal to the optical axis. Plate magnets 171 and 172 are magnetized such that different magnet poles are formed in the thickness direction. Plate magnets 171 and 172 are disposed to be adjacent to each other with different magnet poles directing upward (to the positive side in the Z axis direction). In the present exemplary embodiment, magnet unit 170 includes two plate magnets 171 and 172. However, a magnet unit including one magnetized plate magnet may be used.

First coil 181 is disposed so as to face the main surfaces of the plate magnets 171 and 172 at the positive side in the Z axis direction. First coil 181 is wound into substantially an ellipse as a whole, and the longer axis direction of the ellipse extends along the longitudinal direction of plate magnets 171 and 172. First coil 181 is disposed to span two plate magnets 171 and 172. A pair of opposing longitudinal parts of first coil 181 is disposed to face the substantially central part of each of plate magnets 171 and 172 in the width direction. With this, magnetic field M1 vertical to the main surfaces of plate magnets 171 and 172 at the positive side in the Z axis direction (upper side in FIG. 6) interlinks the longitudinal parts of first coil 181. Electric current generated with a power supply to first coil 181 interlinks magnetic field M1, so that thrust force (thrust force in the direction parallel to X-Y plane) in X-Y plane is generated. Specifically, with the control of electric current to first coil 181, magnet unit 170 can be moved in X-Y plane (in the direction parallel to X-Y plane).

On the other hand, a pair of second coils 182 is disposed so as to face the main surfaces of plate magnets 171 and 172 at the negative side in the Z axis direction (lower side in FIG. 6). Each of second coils 182 is wound into substantially an ellipse as a whole, and the longer axis direction of the ellipse extends along the longitudinal direction of plate magnets 171 and 172. Each of a pair of second coils 182 is disposed to face each of two plate magnets 171 and 172. Longitudinal parts of a pair of second coils 182 are disposed to face both ends of plate magnets 171 and 172 in the width direction. With this, magnetic field M2 parallel to the main surfaces of plate magnets 171 and 172 at the negative side in the Z axis direction interlinks the longitudinal parts of second coil 182. Electric current generated with a power supply to second coils 182 interlinks magnetic field M2, so that thrust force in the Z axis direction is generated.

Specifically, with the control of electric current to a pair of second coils 182, magnet unit 170 can be moved in the Z axis direction.

When electric currents to first coil 181 and a pair of second coils 182 in all magnet units 170 are comprehensively controlled, the attitude of lens holder 140 with respect to the Z axis direction can be controlled. Specifically, lens holder 140 can be moved with six degrees of freedom, that is, in the X axis direction, the Y axis direction, the Z axis direction, the rotating direction about the X axis, the rotating direction about the Y axis, and the rotating direction about the Z axis.

Magnet unit 170, first coil 181, and second coils 182 form aberration correction driving unit 120.

Figure 7:
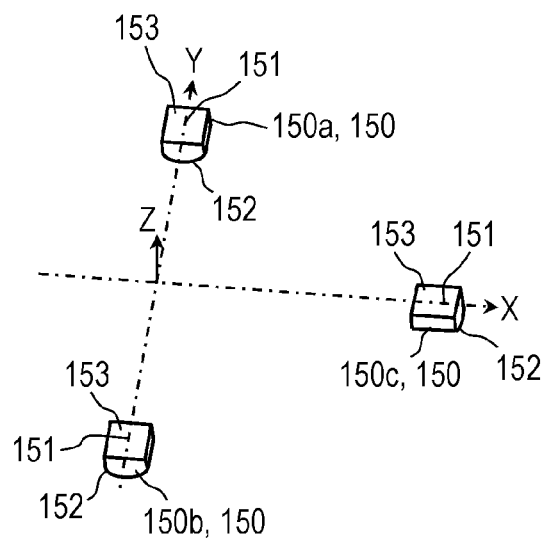
FIG. 7 is a perspective view illustrating a light transmissive unit provided to each piece part of the optical system driving device according to the first exemplary embodiment.

FIG. 7 is a perspective view illustrating light transmissive unit 150 provided to each piece part of optical system driving device 100 according to the first exemplary embodiment. FIG. 7 illustrates light transmissive unit 150 alone. Light transmissive unit 150 is a condenser condensing light. For example, it is a cylindrical lens. In the present exemplary embodiment, a convex cylindrical lens is used as one example. However, a concave cylindrical lens may be used, so long as it condenses light. Light transmissive unit (first light transmissive unit 150a) provided to first piece part 141 has axis 151 along the Y axis direction and convex surface 152 facing the negative side in the Z axis direction. Flat surface 153 of first light transmissive unit 150a opposite to convex surface 152 is parallel to the planes of lenses 42a and 42b orthogonal to the optical axis. The same configuration as described above is applied to light transmissive unit (second light transmissive unit 150b) provided to second piece part 142.

Light transmissive unit (third light transmissive unit 150c) provided to third piece part 143 has axis 151 along the X axis direction and convex surface 152 facing the negative side in the Z axis direction. Flat surface 153 of third light transmissive unit 150c opposite to convex surface 152 is parallel to the planes of lenses 42a and 42b orthogonal to the optical axis.

As illustrated in FIGS. 2 to 5, fourth piece part 144 projects from the peripheral edge of lens holder 140 in the X axis direction. Fourth piece part 144 is engaged with restriction unit 160 fixed to lens barrel 3.

Figure 8:
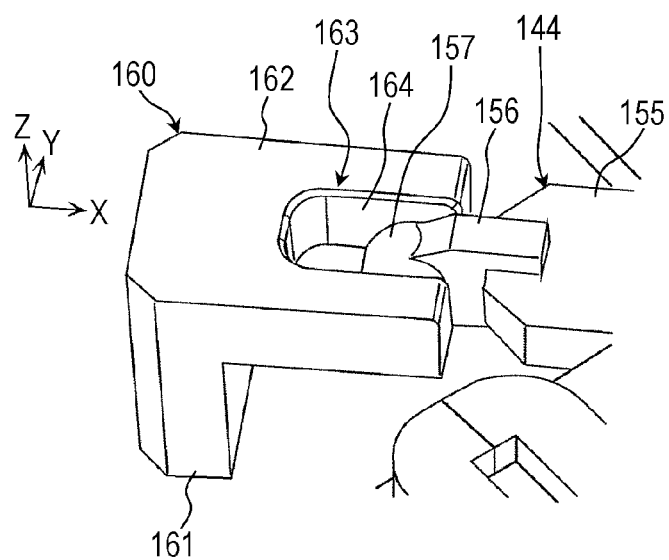
FIG. 8 is a perspective view illustrating a fourth piece part of the optical system driving device and a restriction unit according to the first exemplary embodiment.
Figure 9:
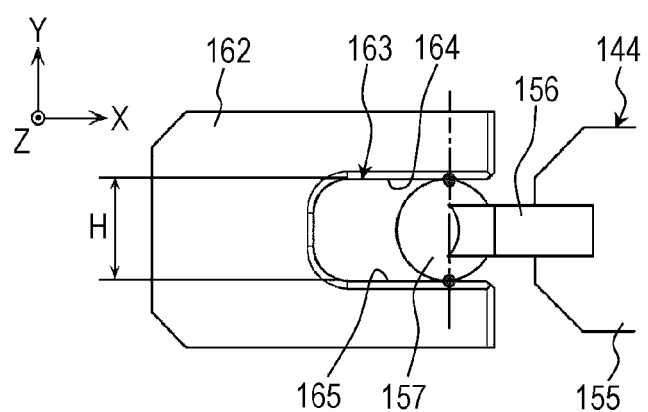
FIG. 9 is a front view illustrating a fourth piece part of the optical system driving device and a restriction unit according to the first exemplary embodiment.

FIG. 8 is a perspective view illustrating fourth piece part 144 of optical system driving device 100 and restriction unit 160 according to the first exemplary embodiment. FIG. 9 is a front view illustrating fourth piece part 144 of optical system driving device 100 and restriction unit 160 according to the first exemplary embodiment.

Fourth piece part 144 includes body 155, arm 156, and shaft 157.

Body 155 projects from the end of lens holder 140 along the X axis direction. Arm 156 extends outward from the tip of body 155. Arm 156 is formed such that the width in the Y axis direction is smaller than body 155. Shaft 157 is a protruding part which is formed into a substantially sphere and has a spherical surface, and is mounted at the tip of arm 156. The diameter of shaft 157 is larger than the width of arm 156 in the Y axis direction. The center of arm 156 in the Y axis direction is overlapped with the center of shaft 157. With this, both ends of shaft 157 in the Y axis direction project from arm 156 with the same width.

Restriction unit (second member) 160 restricts one degree of freedom out of degrees of freedom in which lens holder 140 can be moved. Specifically, restriction unit 160 restricts the movement of lens holder 140 in the rotating direction about the Z axis. With this, lens holder 140 is movable in five degrees of freedom.

Restriction unit 160 is fixed at a position which is near lens holder 140 and opposite to fourth piece part 144. Restriction unit 160 includes base 161 and support part 162. Base 161 erects along the Z axis direction from a support member (not illustrated) in lens barrel 3. Support part 162 extends from the tip of base 161 toward lens holder 140 along the X axis direction. Support part 162 has a storage recess 163 for storing shaft 157. Storage recess 163 is recessed from the tip end face of support part 162 at the positive side in the X axis direction toward the negative side in the X axis direction, and is also open in the Z axis direction. A pair of planes 164 and 165 defining storage recess 163 is parallel to each other, and is parallel to Z-X plane, planes 164 and 165 being opposite to each other in the Y axis direction. In other words, width H of storage recess 163 in the Y axis direction is almost entirely uniform. A pair of planes 164 and 165 holds shaft 157 in the Y axis direction with a point contact. A pair of opposing planes 164 and 165 is separated from each other with width H by which planes 164 and 165 are in contact with shaft 157. Specifically, shaft 157 slides on a pair of planes 164 and 165 with a spherical surface which forms an outer surface, thereby being capable of being translated in the X axis direction and Z axis direction within a pair of planes 164 and 165. When a basis of the three-dimensional coordinate system is set on a center of shaft 157, shaft 157 can be moved in the rotating direction about the X axis, the rotating direction about the Y axis, and the rotating direction about the Z axis as being held by a pair of planes 164 and 165, since the spherical surface serving as the outer surface of shaft 157 slides on a pair of planes 164 and 165.

Specifically, when a basis of the three-dimensional coordinate system is set on a center of shaft 157, shaft 157 can be moved in five degrees of freedom, that is, in the X axis direction, the Z axis direction, the rotating direction about the X axis, the rotating direction about the Y axis, and the rotating direction about the Z axis.

The degree of freedom in which shaft 157 is movable has been described above. However, a degree of freedom is different, when it is considered from lenses 42a and 42b held by lens holder 140. The movement of shaft 157 in the Y axis direction is restricted by restriction unit 160. Therefore, when the basis of the three-dimensional coordinate system is set on the center of lens holder 140 or lens 42a, lens holder 140 is unable to rotate about the optical axis (Z axis). When lens holder 140 is rotated about the Z axis based on shaft 157 and shaft 157 is moved in the X axis direction, even if the movement of shaft 157 in the Y axis direction is restricted, lens holder 140 can be moved in the Y axis direction.

As described above, when the basis of the three-dimensional coordinate system is set on a center of lens 42a, lens holder 140 can be moved in five degrees of freedom, that is, in the X axis direction, the Y axis direction, the Z axis direction, the rotating direction about the X axis, and the rotating direction about the Y axis.

Although not illustrated, a regulation piece for preventing disengagement of shaft 157 from storage recess 163 is provided in lens barrel 3 for preventing shaft 157 from being disengaged from storage recess 163.

Light-emitting unit 131 emits light toward light transmissive unit 150, and it is a laser diode emitting laser light, for example. As illustrated in FIGS. 2 to 4, three light-emitting units 131 are provided. Each of light-emitting units 131 is disposed so as to emit light toward light transmissive unit 150 at the positive side of light transmissive unit 150 in the Z axis direction. An LED (Light Emitting Diode) can be used as light-emitting unit 131.

Optical detector 132 receives light, which is emitted from light-emitting unit 131 and passes through light transmissive unit 150, and outputs a light-receiving signal based on the received light. Optical detector 132 is a quadrant photodetector, for example. It converts a quantity of light received in each separation region into a voltage, and outputs the voltage to the outside as a light-receiving signal. A light-receiving signal has a larger value, as an area receiving light is larger. Three optical detectors 132 are provided so as to make a pair with each of light-emitting units 131. Each of optical detectors 132 is disposed to face light-emitting unit 131 through light transmissive unit 150. A spot of light emitted from light-emitting unit 131 and passing through light transmissive unit 150 is formed on a light-receiving surface of each of optical detectors 132.

Light-emitting unit 131 and optical detector 132 are fixed to the support member (not illustrated) in lens barrel 3, and the relative positional relation of light-emitting unit 131 and optical detector 132 does not vary.

FIG. 10 is a front view schematically illustrating an arrangement example of optical detectors 132 in optical system driving device 100 according to the first exemplary embodiment.

Each of optical detectors 132 has separation boundaries L1 and L2. Separation boundaries L1 and L2 are set to bisect each other at the center of the light-receiving surface, thereby equally separating the light-receiving surface into four.

As illustrated in FIG. 10, optical detector 132 is disposed such that separation boundary L1 and separation boundary L2 are shifted at 45 degrees relative to the X axis and the Y axis respectively.

FIG. 11A is an explanatory view illustrating how a spot of light passing through first light transmissive unit 150a (see FIG. 7) in optical system driving device 100 according to the first exemplary embodiment is changed on the light-receiving surface of optical detector 132 with the movement of first light transmissive unit 150a in the Z axis direction. FIG. 11B is an explanatory view illustrating how a spot of light passing through first light transmissive unit 150a is changed on the light-receiving surface of optical detector 132 with the movement of first light transmissive unit 150a to a reference position in the Z axis direction. FIG. 11C is an explanatory view illustrating how a spot of light passing through first light transmissive unit 150a is changed on the light-receiving surface of optical detector 132 with the movement of first light transmissive unit 150a to the positive side in the Z axis direction.

As illustrated in FIG. 11B, when first light transmissive unit 150a is located on the reference position in the Z axis direction, light passing through first light transmissive unit 150a forms substantially circular spot P on the light-receiving surface. Since first light transmissive unit 150a is a cylindrical lens having axis 151 along the Y axis direction, a focal position in the X axis direction and a focal position in the Y axis direction are shifted from each other to cause astigmatism. Therefore, the shape of spot P varies depending on the distance of the optical axis (Z axis direction). Specifically, when first light transmissive unit 150a moves toward the negative side in the Z axis direction, that is, when first light transmissive unit 150a moves close to optical detector 132, the shape of spot P becomes an ellipse illustrated in FIG. 11A. On the other hand, when first light transmissive unit 150a moves toward the positive side in the Z axis direction, that is, when first light transmissive unit 150a moves away from optical detector 132, the shape of spot P becomes an ellipse illustrated in FIG. 11C. The longitudinal direction of the ellipse of spot P is shifted by 90 degrees depending on whether first light transmissive unit 150a moves toward the positive side or toward the negative side in the Z axis direction from the reference position.

Even if first light transmissive unit 150a illustrated in FIG. 7 moves in the Y axis direction or rotates about the X axis, the position and shape of spot P are not changed, since axis 151 of first light transmissive unit 150a extends along the Y axis direction. When first light transmissive unit 150a moves in the X axis direction or rotates about the Y axis, the position of spot P moves in the X axis direction. This is similarly applied to a spot formed with light passing through second light transmissive unit 150b and formed on the light-receiving surface of second optical detector 132b.

Even if third light transmissive unit 150c illustrated in FIG. 7 moves in the X axis direction or rotates about the Y axis, the position and shape of spot P are not changed, since axis 151 of third light transmissive unit 150c extends along the X axis direction. When third light transmissive unit 150c moves in the Y axis direction or rotates about the X axis, the position of spot P moves in the Y axis direction.

From these, relations represented by equations (1) to (6) described below are established.

Specifically, as illustrated in FIG. 10, a1, b1, c1, and d1 are each a light-receiving signal (voltage value) of each of separation regions of first optical detector 132a facing first light transmissive unit 150a (see FIG. 7). a2, b2, c2, and d2 are each a light-receiving signal (voltage value) of each of separation regions of second optical detector 132b facing second light transmissive unit 150b (see FIG. 7). a3, b3, c3, and d3 are each a light-receiving signal (voltage value) of each of separation regions of third optical detector 132c facing third light transmissive unit 150c (see FIG. 7).

In the description below, x is a variable indicating X-coordinate at the centers of lenses 42a and 42b. y is a variable indicating Y-coordinate at the centers of lenses 42a and 42b. z is a variable indicating Z-coordinate at the centers of lenses 42a and 42b. θx is a variable indicating an angle about the X axis at the centers of lenses 42a and 42b. θy is a variable indicating an angle about the Y axis at the centers of lenses 42a and 42b. In addition, α1, α2, α3, β11, β12, β21, β22, γ1, and γ2 are correction coefficients. Suitable values are obtained for correction coefficients from various experiments and simulations.

$$PD11 = a1 - d1 = \alpha1 \times x + \beta21 \times \theta y \quad (1)$$

$$PD12 = a1 + d1 - (b1 + c1) = \alpha3 \times z + \beta12 \times \theta x \quad (2)$$

$$PD21 = \alpha2 - d2 = \alpha1 \times x + \beta21 \times \theta y \quad (3)$$

$$PD22 = a2 + d2 - (b2 + c2) = \alpha3 \times z - \beta12 \times \theta x \quad (4)$$

$$PD31 = c3 - b3 = \alpha2 \times y + \beta11 \times \theta x \quad (5)$$

$$PD32 = a3 + d3 - (b3 + c3) = \alpha3 \times z + \beta22 \times \theta y \quad (6)$$

The relations represented by equations (7) to (11) can be derived by solving these equations (1) to (6).

$$\theta x = \gamma1 \times (PD12 - PD22) \quad (7)$$

$$\theta y = \gamma2 \times (PD32 - (PD12 + PD22)/2)) \quad (8)$$

$$x = PD11 - \beta2 \times \theta y = (PD11 - \beta21 \times \gamma2 \times (PD32 - (PD12 + PD22/2)))/\alpha1 \quad (9)$$

$$y = PD31 - \beta1 \times \theta x = (PD31 - \beta11 \times \gamma1 \times (PD12 - PD22))/\alpha2 \quad (10)$$

$$z = (PD12 + PD22)/(2 \times \alpha3) \quad (11)$$

Lens controller 36 performs calculation based on a light-receiving signal output from each of optical detectors 132 and the above relation equations (1) to (11) to detect a position of lens holder 140 in each degree of freedom. Lens controller 36 is a calculation unit calculating a position in each degree of freedom. Detection unit 200 is composed of light-emitting units 131, optical detectors 132, and lens controller 36 (see FIG. 1).

1-2. Operation

An operation of digital camera 1 thus configured will be described below.

Figure 12:
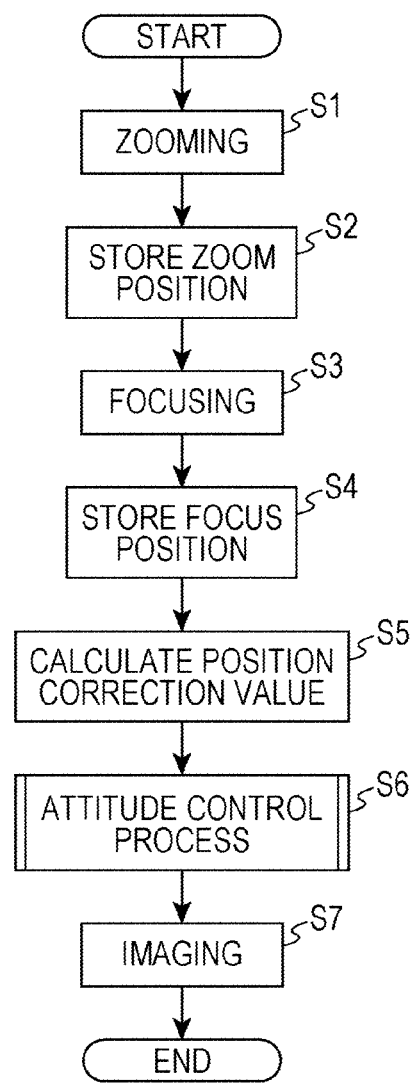
FIG. 12 is a flowchart illustrating a flow of a photographing process executed by a controller in a digital camera according to the first exemplary embodiment.

FIG. 12 is a flowchart illustrating a flow of a photographing process executed by controller 22 in digital camera 1 according to the first exemplary embodiment.

As illustrated in FIG. 12, when zooming operation is performed with the zoom lever, controller 22 controls zoom driving unit 31 through lens controller 36 to move first lens group 41 along an optical axis during the zooming operation (step S1). Controller 22 recognizes a zoom position of first lens group 41 based on an output result from zoom encoder 33 upon the end of the zooming operation, and stores this zoom position (step S2).

When an autofocus operation is performed with the shutter button, controller 22 then controls focus driving unit 32 through lens controller 36 to move third lens group 43 along the optical axis during the autofocus operation (step S3). Controller 22 recognizes a focus position of third lens group 43 based on an output result from focus encoder 34, and stores this focus position (step S4).

Controller 22 then calculates a position correction value of second lens group 42 from the zoom position of first lens group 41 and the focus position of third lens group 43 (step S5).

Controller 22 then outputs the position correction value of second lens group 42 to lens controller 36 to cause lens controller 36 to execute an attitude control process (step S6).

Figure 13:
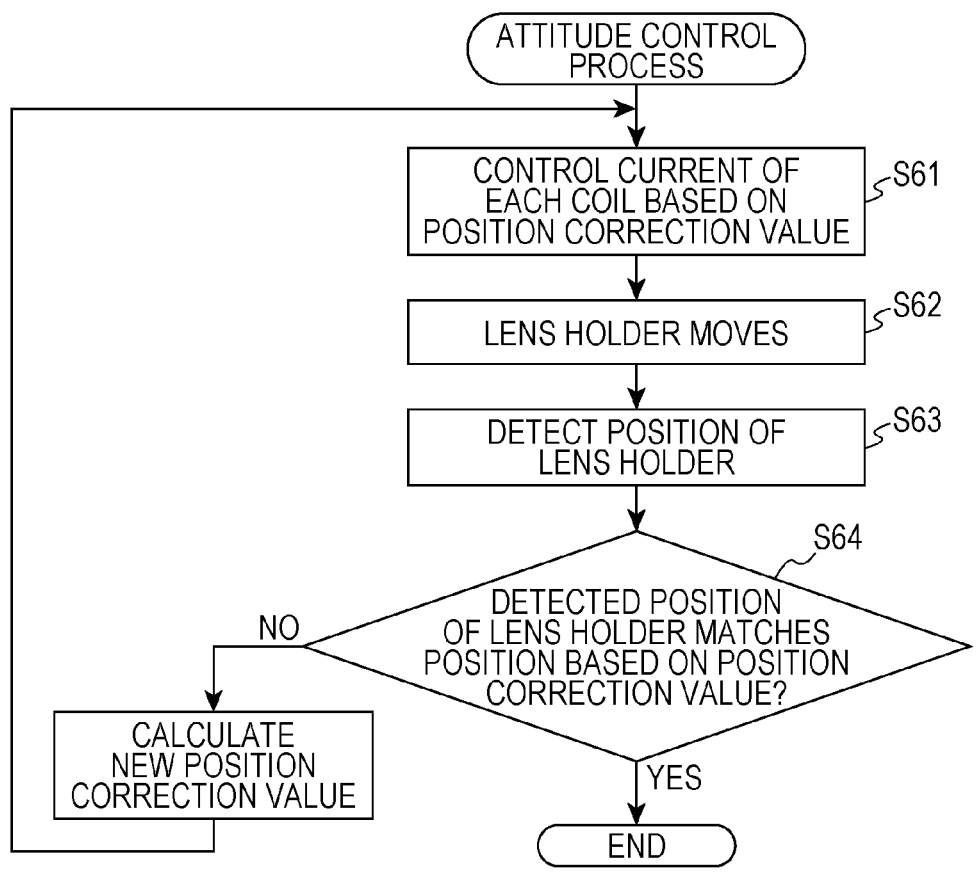
FIG. 13 is a flowchart illustrating a flow of an attitude control process executed by a lens controller in the optical system driving device according to the first exemplary embodiment.

FIG. 13 is a flowchart illustrating a flow of the attitude control process executed by lens controller 36 in optical system driving device 100 according to the first exemplary embodiment.

As illustrated in FIG. 13, lens controller 36 controls currents of first coils 181 and second coils 182 in all magnet units 170 based on the acquired position correction value (step S61). Specifically, lens controller 36 obtains correction values in each of five degrees of freedom from the position correction value, and determines current values for first coils 181 and second coils 182 in all magnet units 170 from the correction value of each degree of freedom.

With this, lens holder 140 moves in five degrees of freedom, that is, in the X axis direction, the Y axis direction, the Z axis direction, the rotating direction about the X axis, and the rotating direction about the Y axis (step S62).

Then, lens controller 36 detects a position of lens holder 140 in each degree of freedom (step S63). Specifically, lens controller 36 allows each light-emitting unit 131 to emit light toward each optical detector 132 through each light transmissive unit 150. With this, a light-receiving signal from each separation region is output to lens controller 36 from each optical detector 132. Lens controller 36 performs calculation based on the light-receiving signals and the above relation equations to detect a position of lens holder 140 in each degree of freedom.

Then, lens controller 36 determines whether or not the detected position of lens holder 140 in each degree of freedom matches the position in each degree of freedom based on the position correction value (S64).

When they are determined to match each other in step S64 (Yes in step S64), lens controller 36 ends the attitude control process, and proceeds to step S7 illustrated in FIG. 12.

When they are determined not to match each other in step S64 (No in step S64), lens controller 36 calculates a new position correction value from the detected position of lens holder 140 in each degree of freedom (step S65), and proceeds to step S61.

As illustrated in FIG. 12, in step S7, controller 22 executes imaging, when the shutter button is fully depressed.

1-3. Effects

As described above, according to the present exemplary embodiment, the spherical surface of shaft 157 that is a protruding part with spherical surface is in point contact with a pair of parallel planes 164 and 165. With sliding movement of the spherical surface on a pair of planes 164 and 165, shaft 157 can be translated in two degrees of freedom in planar direction in a pair of planes 164 and 165. In addition, with sliding movement of the spherical surface on a pair of planes 164 and 165, shaft 157 can be rotationally moved about the axis in three degrees of freedom in a pair of planes 164 and 165. The movement in five degrees of freedom is enabled with such simple configuration. If the mechanism can be simplified, lens barrel 3 can be downsized.

Since lens holder 140 having shaft 157 serving as a protruding part relatively moves with respect to restriction unit 160 fixed to a predetermined position, lens holder 140 can be moved in five degrees of freedom.

Since shaft 157 is mounted at the end of lens holder 140, the degree of freedom based on shaft 157 and the degree of freedom based on lens holder 140 can be made different from each other. Specifically, in the case of the degree of freedom based on shaft 157, shaft 157 can be moved in five degrees of freedom, that is, in the X axis direction, the Z axis direction, the rotating direction about the X axis, the rotating direction about the Y axis, and the rotating direction about the Z axis. On the other hand, in the case of the degree of freedom based on lens holder 140, lens holder 140 can be moved in five degrees of freedom, that is, in the X axis direction, the Y axis direction, the Z axis direction, the rotating direction about the X axis, and the rotating direction about the Y axis.

As described above, the multi-degree-of-freedom support mechanism corresponding to support mechanism 110 according to the present embodiment includes a first member corresponding to lens holder 140 having a protruding part, which corresponds to shaft 157 with a spherical surface, and a second member corresponding to restriction unit 160 having a pair of parallel planes 164 and 165 opposite to each other across the protruding part. One of the first member and the second member can made relative movement with respect to the other with sliding movement of the spherical surface on the pair of planes 164 and 165. The pair of planes 164 and 165 is in contact with the spherical surface. The relative movement includes translational movement in two degrees of freedom in planar direction and rotational movement about an axis in three degrees of freedom in the pair of planes 164 and 165. With this, the multi-degree-of-freedom support mechanism enables movement in five degrees of freedom with a simple configuration.

The first member corresponding to lens holder 140 may be fixed to a predetermined position. With this, the first member can be moved in five degrees of freedom.

In addition, the pair of planes 164 and 165 may be formed at an end of the second member corresponding to restriction unit 160. With this, shaft 157 can be moved in five degrees of freedom with a simple configuration.

An optical device according to the present embodiment may include the multi-degree-of-freedom support mechanism and lenses 42a and 42b held with the first member. With this configuration, the optical device can be moved in five degrees of freedom with a simple configuration.

Second Exemplary Embodiment 2-1. Configuration

A second exemplary embodiment will be described below with reference to FIGS. 14 and 15. The configurations similar to the first exemplary embodiment are identified by the same reference numerals, and the description for similar configurations and operations may be omitted in some cases.

Figure 14:
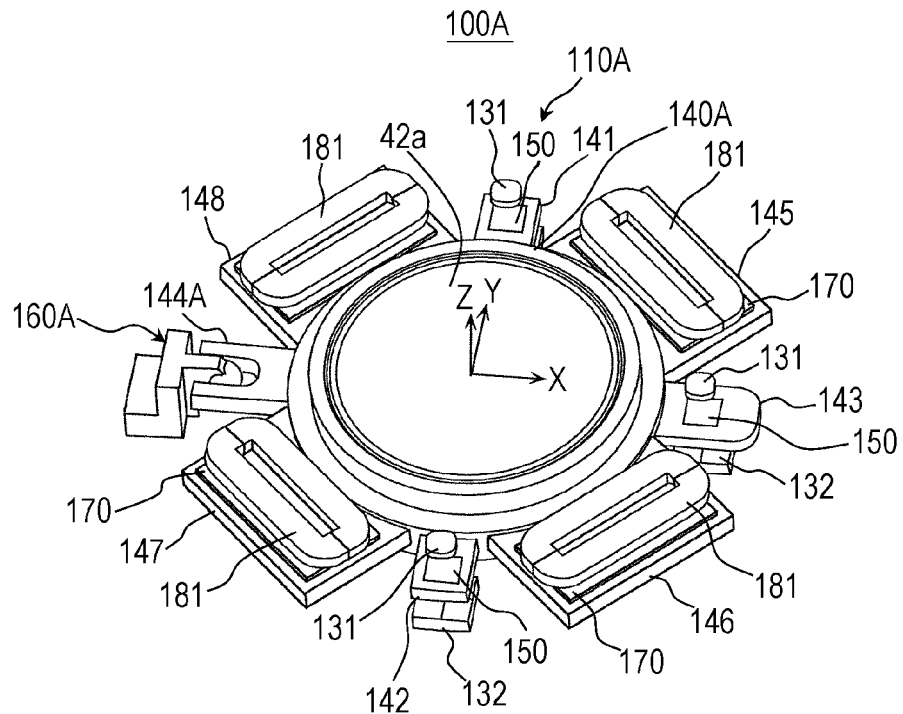
FIG. 14 is a perspective view illustrating an optical system driving device according to a second exemplary embodiment.

FIG. 14 is a perspective view of an optical system driving device 100A according to the second embodiment, wherein reference numeral 110A indicates a support mechanism according to the present embodiment. FIG. 15 is a perspective view illustrating a fourth piece part and a restriction unit.

Figure 15:
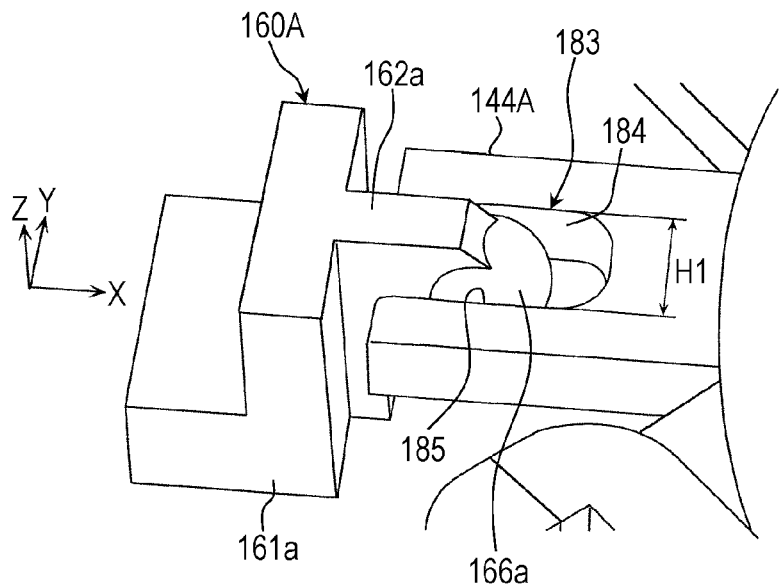
FIG. 15 is a perspective view illustrating a fourth piece part of the optical system driving device and a restriction unit according to the second exemplary embodiment.

As illustrated in FIGS. 14 and 15, restriction unit 160A in support mechanism 110A includes base 161a, arm 162a, and shaft 166a. Base 161a is formed into an L-shape in a side view, and erects along the Z axis direction from a support member (not illustrated) in lens barrel 3. Arm 162a extends from a side face of base 161a at the positive side in the X axis direction toward lens holder 140 along the X axis direction. Shaft 166a is a protruding part mounted at the tip of arm 162a to have substantially a spherical shape. The diameter of shaft 166a is larger than the width of arm 162a in the Y axis direction. The center of arm 162a in the Y axis direction is overlapped with the center of shaft 166a. With this, both ends of shaft 166a in the Y axis direction project from arm 162a with the same width.

Fourth piece part 144A of lens holder 140A has storage recess 183 for storing shaft 166a. Storage recess 183 is recessed from the tip end face of fourth piece part 144A at the negative side in the X axis direction toward the positive side in the X axis direction, and is also open in the Z axis direction. A pair of planes 184 and 185 which defines storage recess 183 and is opposite to each other in the Y axis direction is parallel to each other, and is parallel to Z-X plane. In other words, width H1 of storage recess 183 in the Y axis direction is almost entirely uniform. A pair of planes 184 and 185 faces each other with width H1 so as to hold shaft 166a therebetween with a point contact in the Y axis direction and to be in contact with shaft 166a. Shaft 166a can be translated in the X axis direction and the Z axis direction within a pair of planes 184 and 185 with the sliding movement of the spherical surface, which forms an outer surface, on a pair of planes 184 and 185. In other words, fourth piece part 144A can be translated in the X axis direction and the Z axis direction with shaft 166a.

When a basis of the three-dimensional coordinate system is set on a center of shaft 166a, shaft 166a can be moved in the rotating direction about the X axis, the rotating direction about the Y axis, and the rotating direction about the Z axis as being held by a pair of planes 184 and 185, since the spherical surface serving as the outer surface of shaft 166a slides on a pair of planes 184 and 185. In other words, fourth piece part 144A can be moved in the rotating direction about the X axis, the rotating direction about the Y axis, and the rotating direction about the Z axis with shaft 166a.

As described above, when a basis of the three-dimensional coordinate system is set on a center of shaft 166a, fourth piece part 144A can be moved in five degrees of freedom, that is, in the X axis direction, the Z axis direction, the rotating direction about the X axis, the rotating direction about the Y axis, and the rotating direction about the Z axis.

The degree of freedom in which fourth piece part 144A is movable has been described above. However, a degree of freedom is different, when it is considered from lenses 42a and 42b held by lens holder 140A. The movement of fourth piece part 144A in the Y axis direction is restricted by restriction unit 160A. Therefore, when the basis of the three-dimensional coordinate system is set on the center of lens holder 140A or lens 42a, lens holder 140A is unable to rotate about the optical axis (Z axis). When fourth piece part 144A is moved in the X axis direction while lens holder 140A is rotated about the Z axis based on shaft 166a, even if the movement of fourth piece part 144A in the Y axis direction is restricted, lens holder 140A can be moved in the Y axis direction.

As described above, when the basis of the three-dimensional coordinate system is set on a center of lens 42a, lens holder 140A can be moved in five degrees of freedom, that is, in the X axis direction, the Y axis direction, the Z axis direction, the rotating direction about the X axis, and the rotating direction about the Y axis.

2-2. Effects

As described above, according to the present exemplary embodiment, lens holder 140 can be moved in five degrees of freedom, since lens holder 140 relatively moves with respect to restriction unit 160A having shaft 157 which is a substantially spherical protruding part.

Since a pair of planes 184 and 185 is mounted at the end of lens holder 140A, the degree of freedom based on shaft 166a and the degree of freedom based on lens holder 140A can be made different from each other. Specifically, in the case of the degree of freedom based on fourth piece part 144A, fourth piece part 144A can be moved in five degrees of freedom, that is, in the X axis direction, the Y axis direction, the rotating direction about the X axis, the rotating direction about the Y axis, and the rotating direction about the Z axis, as described above On the other hand, in the case of the degree of freedom based on lens holder 140A, lens holder 140A can be moved in five degrees of freedom, that is, in the X axis direction, the Y axis direction, the Z axis direction, the rotating direction about the X axis, and the rotating direction about the Y axis.

As described above, an optical device according to the present exemplary embodiment may include the multi-degree-of-freedom support mechanism corresponding to support mechanism 110 and lenses 42a and 42b held with the second member corresponding to lens holder 140. With this configuration, the optical device can be moved in five degrees of freedom with a simple configuration.

Other Exemplary Embodiments

As presented above, the first and second exemplary embodiments have been described as an example of the technology described in the present application. However, the technology in the present disclosure is not limited to these, and can be applied to embodiments in which various changes, replacements, additions, omissions, or the like are made.

Other exemplary embodiments will be described below.

The first and second exemplary embodiments describe that optical system driving device 100 moves a lens as an example. However, other optical elements can be moved with optical system driving device 100. Examples of optical elements other than lens include a mirror and a light guide plate.

The first and second exemplary embodiments indicate an imaging device such as digital camera 1 as an example of an optical device. However, other optical devices may be used. A projection device such as a projector may be used as other optical devices.

In addition, support mechanism 110 may be provided to a drive device other than optical system driving device 100. Support mechanism 110 according to the present disclosure is applicable to a device including a mechanism which moves a support target in five degrees of freedom.

In addition, shaft 157 is not necessarily spherical as a whole. It may be substantially spherical. Specifically, shaft 157 may have a spherical surface only within a range with which at least a pair of planes 164 and 165 can be in contact. More specifically, when shaft 157 rotationally moves in each of degrees of freedom which are about the X axis, about the Y axis, and about the Z axis, at least the part of the surface within the range of the rotational movement may be spherical. That is, if the part of the surface within the range of the rotational movement is spherical, the other parts of the surface may be aspherical within a range not interfering with the sliding movement of shaft 157. The wording of "substantially spherical" includes such shape.

The first and second exemplary embodiments indicate aberration correction driving unit 120 including magnet unit 170, first coil 181, and second coil 182 as an example of a driving unit which moves lens holder 140. A unit that can move lens holder 140 (movable body) in each degree of freedom in which lens holder 140 is movable may be used as the driving unit. For example, a multi-degree-of-freedom actuator using a motor may be used as the driving unit.

As presented above, the exemplary embodiments have been described as an example of the technology described in the present disclosure. For this purpose, the accompanying drawings and the detailed description are provided.

Therefore, components in the accompanying drawings and the detail description may include not only components essential for solving problems, but also components that are provided to illustrate the above described technology and are not essential for solving problems. Therefore, such inessential components should not be readily construed as being essential based on the fact that such inessential components are shown in the accompanying drawings or mentioned in the detailed description.

Further, the above described embodiments have been described to exemplify the technology according to the present disclosure, and therefore, various modifications, replacements, additions, and omissions may be made within the scope of the claims and the scope of the equivalents thereof.

The present disclosure relates to a multi-degree-of-freedom support mechanism that enables movement of a support target in five degrees of freedom, and an optical system driving device including the multi-degree-of-freedom support mechanism. Specifically, the present disclosure is applicable to a digital camera, a movie, a projector, and the like.

What is claimed is:

1. A multi-degree-of-freedom support mechanism comprising:
   a first member having a protruding part with a single spherical surface; and
   a second member having a pair of planes opposite to each other across the protruding part, wherein
   one of the first member and the second member is able to make relative movement with respect to the other with sliding movement of the single spherical surface on the pair of planes, and the pair of planes is in contact with the single spherical surface, and
   the relative movement of the one of the first member and second member being moveable in five degrees of freedom including translational movement in two degrees of freedom in planar direction and rotational movement in three degrees of freedom around three rotational axes, each of the three rotational axes being orthogonal to the other two rotational axes and passing through a substantial center of the single spherical surface in the pair of planes.

2. The multi-degree-of-freedom support mechanism according to claim 1, wherein
   the second member is fixed to a predetermined position, and
   the first member is movable with respect to the second member.

3. The multi-degree-of-freedom support mechanism according to claim 2, wherein the protruding part is provided at an end of the first member.

4. The multi-degree-of-freedom support mechanism according to claim 1, wherein
   the first member is fixed to a predetermined position, and
   the second member is movable with respect to the first member.

5. The multi-degree-of-freedom support mechanism according to claim 4, wherein the pair of planes is formed on an end of the second member.

6. The multi-degree-of-freedom support mechanism according to claim 1, wherein
   the first member or the second member includes an optical element holding unit that is able to hold an optical element,
   the optical element holding unit being displaceable in a direction along a first axis that is an optical axis, a direction along a second axis orthogonal to the first axis in a plane orthogonal to the first axis, and a direction along a third axis orthogonal to the second axis in the plane, with the relative movement.

7. The multi-degree-of-freedom support mechanism according to claim 6, wherein the optical element holding unit is further displaceable in a rotating direction about the second axis and a rotating direction about the third axis with the relative movement.

8. A lens barrel comprising:
   the multi-degree-of-freedom support mechanism according to claim 1; and
   an optical element held with the first member or the second member.

9. An optical device comprising:
   the lens barrel according to claim 8; and
   a body that acquires or projects an image through an optical system in the lens barrel.

10. The multi-degree-of-freedom support mechanism according to claim 1, wherein
    with respect to the relative movement of the one of the first member and second member in view of three degrees of translational freedom and three degrees of rotation freedom, only a degree of translational freedom in a direction perpendicular to the planar direction is restricted to provide the five degrees of freedom.

* * * * *